(12) United States Patent
Nishikawa

(10) Patent No.: US 6,902,127 B2
(45) Date of Patent: Jun. 7, 2005

(54) REEL UNIT FOR SPINNING REEL

(75) Inventor: Tomohiro Nishikawa, Osaka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 10/764,588

(22) Filed: Jan. 27, 2004

(65) Prior Publication Data

US 2004/0200917 A1 Oct. 14, 2004

(30) Foreign Application Priority Data

Feb. 5, 2003 (JP) .................................... 2003-028471

(51) Int. Cl.[7] ............................................. A01K 89/01
(52) U.S. Cl. ........................ 242/311; 242/310; 242/312
(58) Field of Search ............................... 242/310, 311, 242/312

(56) References Cited

U.S. PATENT DOCUMENTS

| | | | |
|---|---|---|---|
| 2002/0056776 A1 * | 5/2002 | Sugawara | 242/231 |
| 2003/0146324 A1 * | 8/2003 | Yeh | 242/311 |
| 2003/0146325 A1 * | 8/2003 | Kitajima | 242/311 |

FOREIGN PATENT DOCUMENTS

JP 2002-218871 A 8/2002

* cited by examiner

*Primary Examiner*—Kathy Matecki
*Assistant Examiner*—Evan H Langdon
(74) *Attorney, Agent, or Firm*—Shinjyu Global IP Counselors, LLP (57) ABSTRACT

A spinning-reel reel unit has a housing unit, a first lid, a second lid, a rod-attachment portion, and a cover member. The housing unit has a housing space formed therein for accommodating and supporting a drive mechanism. The first lid is fixedly coupled to a side of the housing unit detachably/reattachably, and includes a first cover portion and a first cut-out. The second lid is fixedly coupled to another side of the housing unit detachably/reattachably, and includes a second cover portion and a second cut-out. The rod-attachment portion is formed integrally with the housing unit and is adapted to be mounted onto a fishing rod. The cover member covers both of the cut-outs of when the lids are fitted to the housing unit. In the spinning-reel reel unit, weight reduction can be achieved even when a cover member is provided.

23 Claims, 9 Drawing Sheets

REEL UNIT FOR SPINNING REEL

BACKGROUND OF THE INVENTION

1. Field of the Invention

The present invention relates to reel units. In particular, the present invention relates to reel units for a spinning-reel that is adapted to be mounted to a fishing rod and in which rotation of a handle is transmitted to a rotor and a line-winding spool through a master gear to wind fishing line around the spool.

2. Background Information

A known spinning-reel reel unit is furnished with a rod-attachment portion adapted to be mounted to a fishing rod, a reel body formed integrally with the rod-attachment portion, a lid fitted detachably and reattachably to the reel body, and a cover member for covering the rear ends of the reel body and the lid, as seen, for example, in Japanese Patent Application Publication No. 2002-218871.

In the reel unit of this kind, a variety of drive mechanisms, such as a rotor drive mechanism including a master gear and an oscillating mechanism for shifting the spool back and forth, are accommodated and supported in the interior of the reel body. A rotation shaft (master gear shaft) for a handle to which the master gear is attached is supported rotatably on the lid and the reel body.

With the lid fitted to the reel body, the cover member is formed so as to cover the bottom corner of the rear end, the bottom surface, and the back surface thereof. The cover member is made of a synthetic resin or a metal and is provided for the purpose of preventing the reel body and the lid member from being scratched and improving the appearance.

For the spinning-reel reel unit with such a configuration, weight reduction is demanded in order to make casting easier. To attain weight reduction, it is conceivable to eliminate the cover member. If the cover member is eliminated, however, the rear end of the reel unit is likely to be scratched easily. In particular, when the reel unit is made of magnesium alloy for the purpose of weight reduction, scratched part easily corrodes.

In view of the above, it will be apparent to those skilled in the art from this disclosure that there exists a need for an improved reel unit of a spinning reel that overcomes the problems discussed above. This invention addresses this need in the art as well as other needs, which will become apparent to those skilled in the art from this disclosure.

SUMMARY OF THE INVENTION

It is an object of the present invention to achieve weight reduction in a spinning-reel reel unit even when the cover member is provided.

A spinning-reel reel unit according to the first aspect of the present invention is a spinning-reel reel unit adapted to be mounted onto a fishing rod, for use in a spinning reel in which rotation of a handle is transmitted to a line-winding rotor and a line-winding spool through a master gear to wind fishing line around the spool. The spinning-reel reel unit includes a housing unit, a first lid, a second lid, a rod-attachment portion, and a cover member. The housing unit has a mechanism accommodating space formed therein for accommodating and supporting therein the master gear. The first lid is fixedly coupled to a side of the housing unit detachably/reattachably, and includes a first cover portion for at least partially covering the mechanism accommodating space of the housing unit in which the master gear is disposed, and a first cut-out portion for partially exposing the housing unit. The second lid is fixedly coupled to another side of the housing unit detachably/reattachably. The rod attachment portion is formed integrally with one of the housing unit and the first lid and is adapted to be mounted to the fishing rod. The cover member is for covering at least the first cut-out portion of the first lid when the first lid is fitted to the housing unit.

In the above-described reel unit, the reel unit includes three separate parts, the housing unit and the first lid for covering a side of the housing unit. Among them, the first lid includes the first cover portion for covering at least that part where the master gear is arranged, and the first cut-out portion for exposing a part of the housing unit which is not the first cover portion. Herein, the first cut-out is provided in the first lid, in which the specific strength needs to be high, over a part where the cover member and the first lid overlap and where the master gear is arranged. Therefore, weight reduction is possible corresponding to the proportion of the cut-out from the first lid. Moreover, since the first cut-out is covered by the cover member, the reel unit is prevented from getting scratched.

A spinning-reel reel unit according to the second aspect of the present invention is a spinning-reel reel unit as set forth in the first aspect, wherein the second lid includes a second cover portion for at least partially covering the mechanism accommodating space of the housing unit, and a second cut-out portion for at least partially exposing the housing unit.

In the above-described reel unit, the reel unit, the second lid includes the second cover portion for covering at least that part where the master gear is arranged, and the second cut-out portion for partially exposing the housing unit. Herein, the second cut-out is provided in a part where the cover member and the second lid overlap. Therefore, further weight reduction is possible corresponding to the proportion of the cut-outs from the first and second lids. Moreover, since the second cut-out is covered by the cover member, the reel unit is prevented from getting scratched.

A spinning-reel reel unit according to the third aspect of the present invention is a spinning-reel reel unit as set forth in one of the first through second aspects, wherein the housing unit is made of a magnesium alloy.

A spinning-reel reel unit according to the fourth aspect of the present invention is a spinning-reel reel unit as set forth in one of the first through third aspects, wherein the first lid is made of an aluminum alloy. In this case, because the housing unit is made of a magnesium alloy and the first lid is made of an aluminum alloy, which has a higher specific strength than a magnesium alloy, the specific strength can be maintained high and yet weight reduction is possible.

A spinning-reel reel unit according to the fifth aspect of the present invention is a spinning-reel reel unit as set forth in one of the second through fourth aspects, wherein the second lid is made of a synthetic resin. Here, the housing unit, which is prone to corrode easily, is covered by the cover member, and both of the lid portions, which are likely to come into contact with other parts, are more unlikely to corrode than the housing unit; therefore, corrosion resistance can be improved.

A spinning-reel reel unit according to the sixth aspect of the present invention is a spinning-reel reel unit adapted to be mounted onto a fishing rod, for use in a spinning reel in which rotation of a handle is transmitted to a line-winding rotor and a line-winding spool through a master gear to wind fishing line around the spool. The spinning-reel reel unit includes a housing unit, a first lid, a second lid, a rod-attachment portion, and a cover member. The housing unit has a mechanism accommodating space formed therein for accommodating and supporting therein the master gear. The first lid is fixedly coupled to a side of the housing unit detachably/reattachably, and includes a first cover portion for at least partially covering the mechanism accommodating space of the housing unit in which the master gear is disposed, and a first cut-out portion for partially exposing the housing unit. The first lid supports a rotation shaft of the master gear. The second lid is integrally formed with the housing unit. The second lid includes a second cover portion for at least partially covering the mechanism accommodating space of the housing unit in which the master gear is disposed, and a second cut-out portion for partially exposing the housing unit. The rod attachment portion is formed integrally with one of the housing unit and the first lid and is adapted to be mounted to the fishing rod. The cover member is for covering at least the first and second cut-out portions of the first and second lids when the first lid is fitted to the housing unit.

With this configuration, the reel unit includes two separate parts, the housing unit having the second lid, and the first lid for covering a side of the housing unit. The first and second lids include the first and second cover portions for at least partially covering the mechanism accommodating space where the master gear is arranged and the first and second cut-outs for exposing the parts of the housing unit not where the first and second cover portions cover. Herein, within the part in which the cover member and the first and second lids overlap, the first and second cut-out portions are provided where the master gear is arranged, where the specific strength needs to be high. Therefore, weight reduction is possible corresponding to the proportion of the cut-out of the first and second lids. Moreover, since the first and second cut-outs are covered by the cover member, the reel unit is prevented from getting scratched.

A spinning-reel reel unit according to the seventh aspect of the present invention is a spinning-reel reel unit as set forth in one of the second through sixth aspects, wherein the first and second lids have first and second shaft-supporting portions for supporting respective ends of the rotation shaft of the master gear. In this case, the fact that the first and second shaft-supporting portions for supporting respective ends of the rotation shaft of the master gear are provided respectively for the first and second lids allows the handle to be mounted to either side of the reel unit. Further, the fact that the rotation shaft of the master gear is supported at both ends means that the rigidity of the supporting structure for the rotation shaft can be maintained high.

A spinning-reel reel unit according to the eighth aspect of the present invention is a spinning-reel reel unit as set forth in one of the first through seventh aspects, wherein the first lid has a shaft-supporting portion for cantilevering the rotation shaft of the master gear. In this case, the fact that the rotation shaft of the master gear is cantilevered means that the thickness of the reel unit along the rotation shaft can be reduced. In addition, since the rotation shaft does not pass through the reel unit, it does not interfere with the drive mechanism, making the arrangement of the drive mechanism easy.

A spinning-reel reel unit according to the ninth aspect of the present invention is a spinning-reel reel unit as set forth in one of the first through eighth aspects, wherein the rod-attachment portion is formed integrally with the housing unit. In this case, since the housing unit and the rod-attachment portion, which are located in the middle sandwiched by the lids, are formed integrally, good lateral balance is achieved.

A spinning-reel reel unit according to the tenth aspect of the present invention is a spinning-reel reel unit as set forth in one of the first through eighth aspects, wherein the rod-attachment portion is formed integrally with the first lid. In this case, since the thick-walled rod-attachment portion is formed integrally with the first lid, variation in wall thickness of the housing unit can be lessened. Thus, the housing unit can be prevented easily from deformation such as shrinkage or the like due to variation in wall thickness when the housing unit is a molded product of a resin or a metal.

A spinning-reel reel unit according to the eleventh aspect of the present invention is a spinning-reel reel unit as set forth in one of the first through tenth aspects, wherein the cover member is fitted extending over a rear portion to a bottom portion of the housing unit. In this case, with the cover member being fitted extending over the rear portion and the bottom portion of the housing unit, the portion that is likely to come in contact when the reel is placed is protected by the cover member, and the housing unit does not easily get scratched even if the housing unit is made of a metal that is lightweight and is prone to corrode.

A spinning-reel reel unit according to the twelfth aspect of the present invention is a spinning-reel reel unit as set forth in one of the first through eleventh aspects, wherein the cover member is made of a synthetic resin. In this case, the fact that the cover member is made of a synthetic resin means that the weight of the cover member can be reduced, and that galvanic corrosion does not occur even if the cover member comes into contact with the housing unit and the first and second lids, which may be made of a metal.

Still preferably, the first and second lids are fastened with a plurality of screws to the housing unit, and at least one of the screws is used to retain the drive mechanism. In this case, the screw(s) for fastening the lids also fasten the drive mechanism, and therefore, the number of assembly parts can be reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
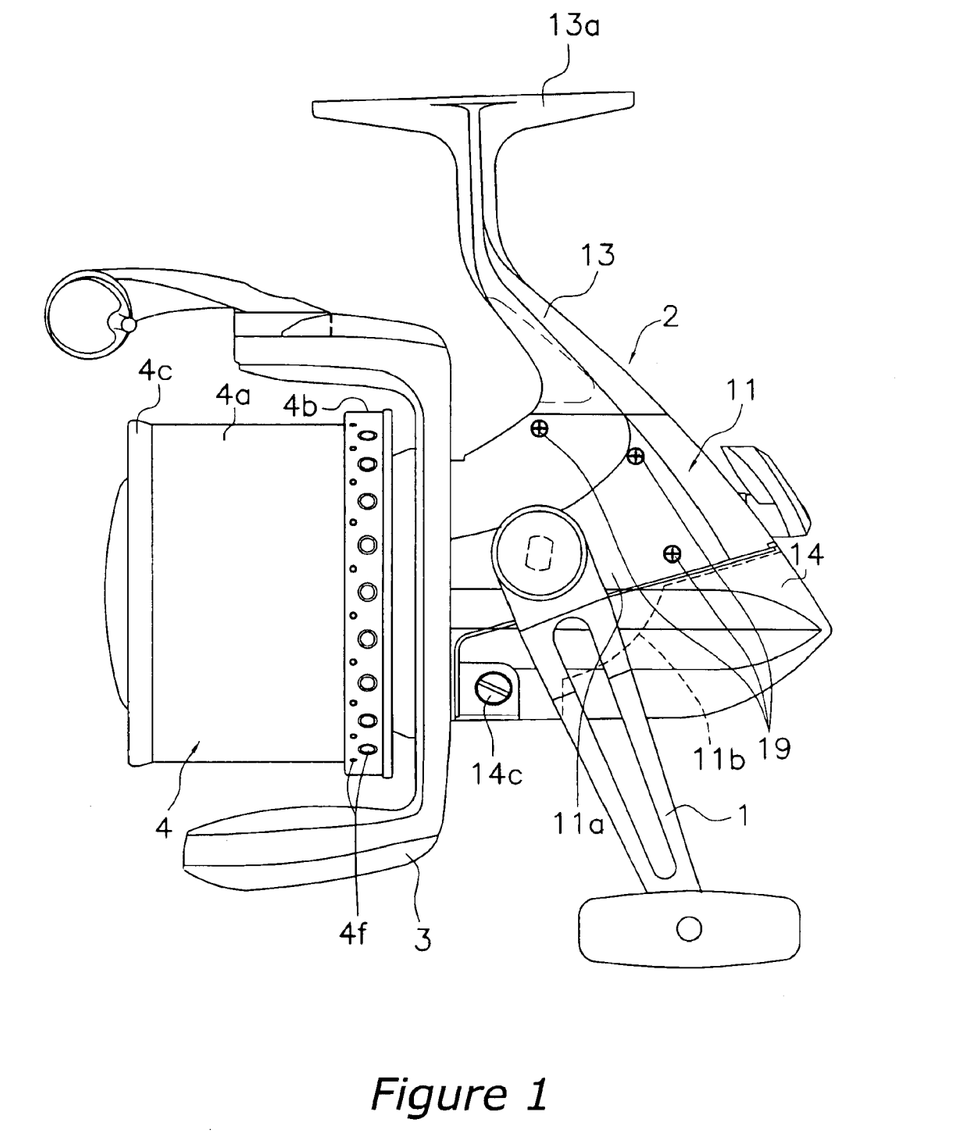
FIG. 1 is a side view of a spinning reel in accordance with one embodiment of the present invention.
Figure 2:
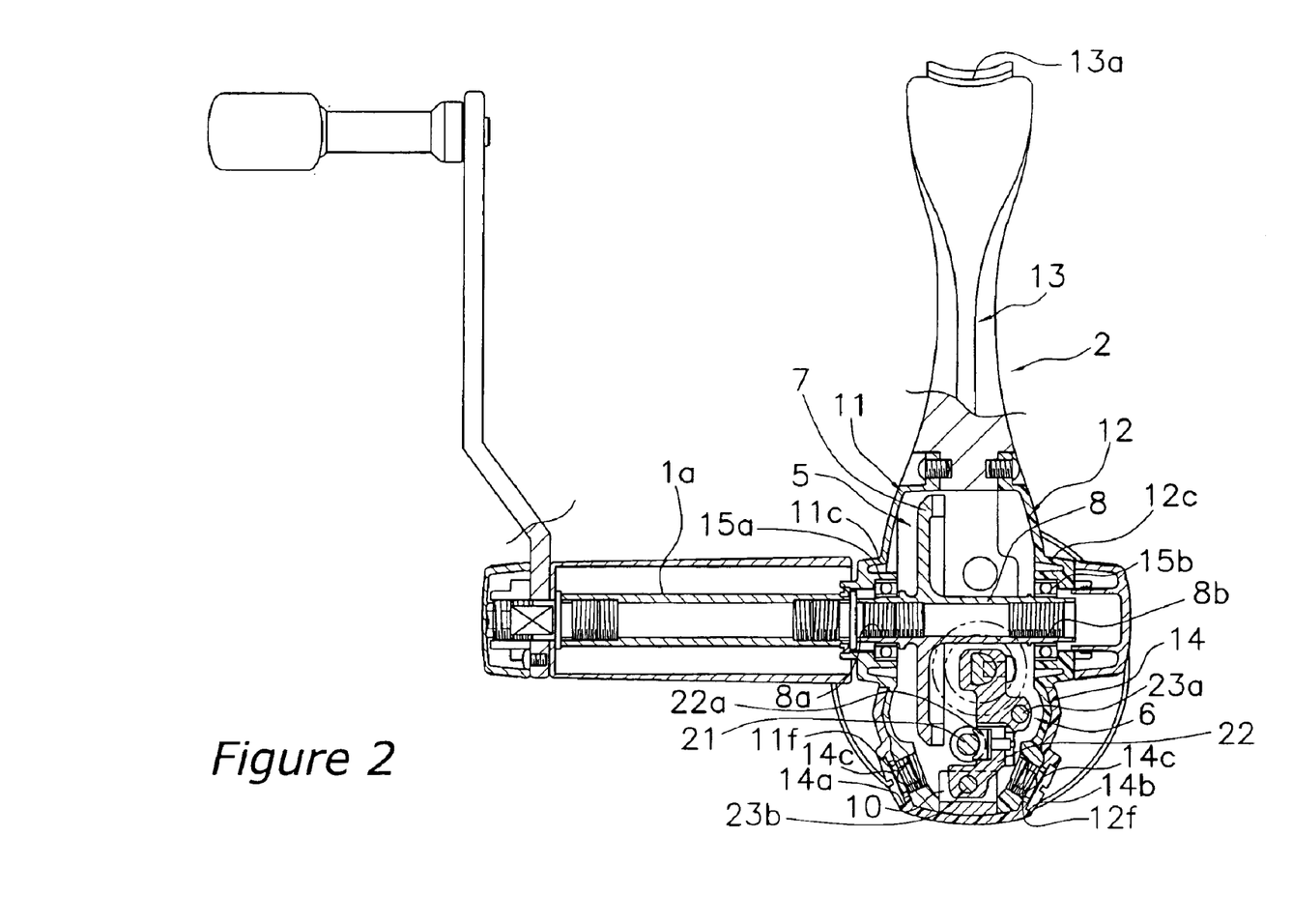
FIG. 2 is a cross-sectional rear view of the spinning reel in accordance with the embodiment of the present invention.
Figure 3:
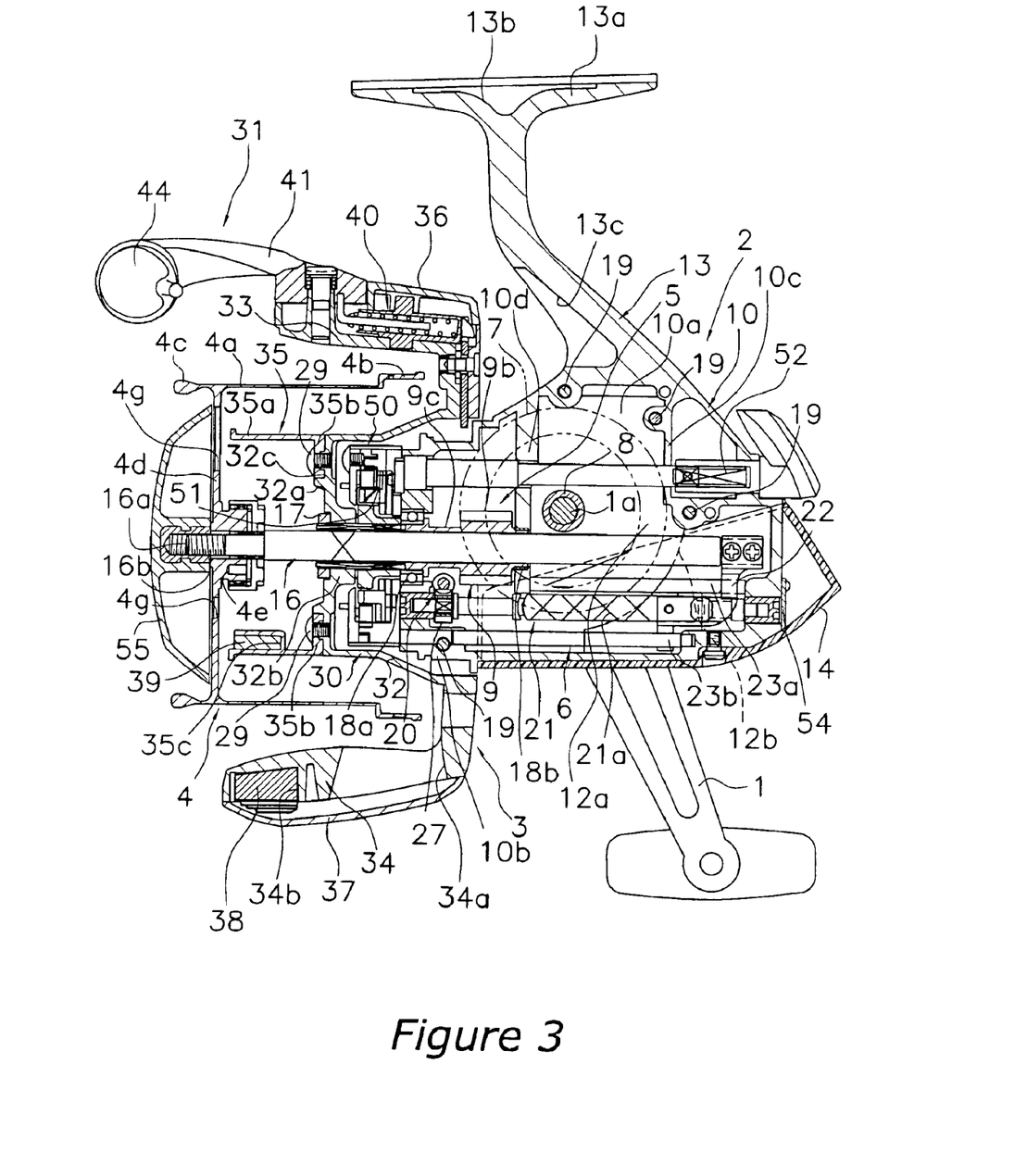
FIG. 3 is a side cross-sectional view of the spinning reel in accordance with the embodiment of the present invention.

Referring to FIGS. 1 to 3, a spinning reel according to a preferred embodiment of the present invention primarily includes a handle 1, a reel unit 2, a rotor 3, and a spool 4. The reel unit 2 rotatably supports the handle 1 and is adapted to be mounted to a fishing rod (not shown). The rotor 3 is rotatively mounted on the front portion of the reel unit 2. The spool 4 is disposed on the front portion of the rotor 3, and moves front and rear relative to the reel unit 2. The spinning reel also includes a rotor drive mechanism 5 to drive the rotor 3 to rotate in cooperation with rotation of the handle 1. The handle 1 can be attached to the right side of the reel unit 2 as shown 1 FIG. 3, or to the left side as shown in FIGS. 1 and 2. The spinning reel further includes an oscillating mechanism 6 to move the spool 4 back and forth in cooperation with rotation of the rotor 3.

The reel unit 2 accommodates the rotor drive mechanism 5 and the oscillating mechanism 6 in the interior thereof. The reel unit 2 includes, as shown in FIGS. 1 to 4, a housing unit 10, first and second lids 11 and 12, a rod-attachment portion 13, and a cover member 14. The housing unit 10 has an opening on both sides thereof. The first and second lids 11 and 12 close both sides of the accommodation space 10a of the housing unit 10. The rod-attachment portion 13 is formed integrally with the housing unit 10. The cover member 14 covers the housing unit 10 and both lids 11 and 12 from the rear ends thereof.

The surface of the housing unit 10 is preferably formed of an anodic oxide film. The housing unit 10 is made of, for example, a magnesium alloy, which is lightweight and capable of maintaining a specific strength. Further, the housing unit 10 is a frame-shaped member in which both surfaces are opened to form an accommodation space 10a that accommodates and supports the rotor drive mechanism 5 and the oscillating mechanism 6, both of which are included in the drive mechanism that drives the spool 4 and rotor 3. The housing unit 10 has a substantially uniform depth dimension (the dimension along the orthogonal direction to the plane of FIG. 3). A disk-shaped mechanism support portion 10b is formed in the front surface of the housing unit 10. The disk-shaped mechanism support portion 10b has a pinion gear 9 (later-described), a one-way clutch 51 (later-described) for an anti-reverse mechanism 50, and the like mounted thereto. An operation support portion 10c to support a switching operation unit 52 (later-described) of the anti-reverse mechanism 50 is formed in the rear portion. An intermediate support portion 10d for supporting the pinion gear 9 and the switching operation unit 52 extends downward from the upper portion at the rear of the mechanism support portion 10b.

The first lid 11 is preferably made of an aluminum alloy that can maintain high specific strength and corrosion resistance. The first lid 11 is formed to cover a first side (the left side as viewed in FIG. 2) of the housing unit 10. The first lid 11 is, as shown in FIG. 2, disposed adjacent to a master gear 7 which is disposed inside the accommodation space 10a. In other words, the first lid 11 is fixedly coupled to the housing unit 10 to interpose the master gear 7 with the housing unit 10. As is clear from FIGS. 1, 2, and 4, the first lid 11 includes a first cover portion 11a and a first cut-out 11b. The first cover portion 11a covers the master gear 7 that rotates according to rotation of the handle 1 in the opening of one side of the housing unit 10. The first cut-out 11b exposes an opening rearward from the first cover portion 11a (further rearward than the portion indicated by the dashed line in FIG. 1). This type of first cut-out 11b is formed to minimize the overlapping portion between the first lid 11 and the cover member 14 to achieve weight reduction.

Figure 4:
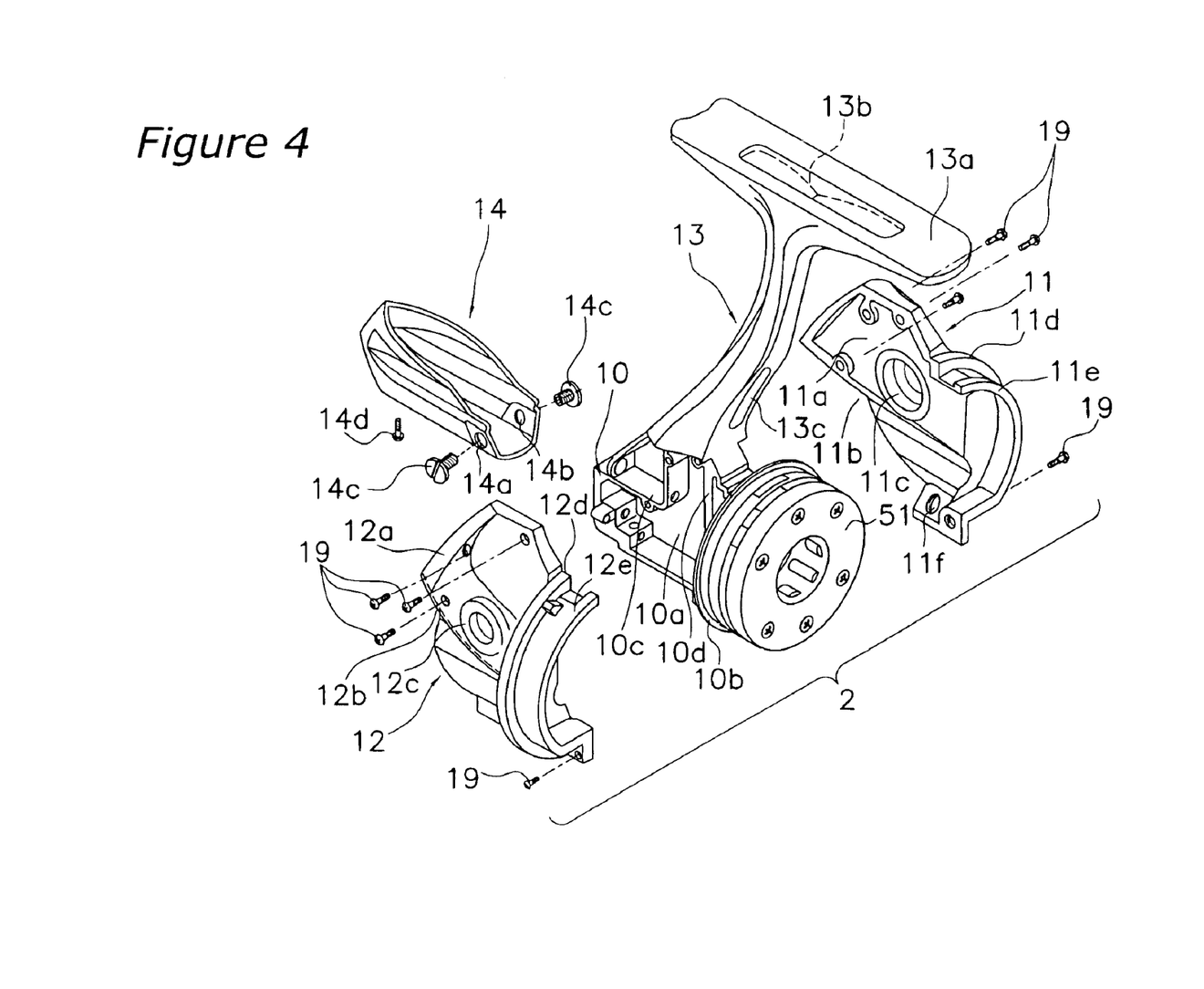
FIG. 4 is an exploded oblique view of a reel unit in accordance with the embodiment of the present invention.

As shown in FIGS. 2, 3, and 4, a first boss portion 11c (first shaft support portion) that supports one end of a master gear shaft 8 on which the master gear 7 is arranged on the back side of the master gear 7. In this embodiment, the master gear 7 and the master gear shaft 8 are integrally formed as a one-piece unitary member. However, the master gear and the master gear shaft may be separate members that are non-rotatably coupled to each other so as transmit rotation of the handle. The first boss portion 11c is formed on the first cover portion 11a of the first lid 11, and protrudes outward on the approximate central portion of the surface of the fist cover portion 11a. An approximately semi-circular first flange portion 11d that constitutes a disk-shaped portion that enters inside the rotor 3 is formed on the front portion of the first lid 11. An approximately semi-circular arc-shaped first mechanism accommodating cover 11e is disposed on the rear surface of the mechanism support portion 10b, and is approximately flush with the outer peripheral surface of the mechanism support portion 10b. The first mechanism accommodating cover 11e is formed on the front portion of the first flange portion 11d. Since the master gear 7 is adjacently arranged to the first lid 11, a large force tends to act on the first boss portion 11c when the master gear shaft 8 receives a large load. In view of this, the first lid 11 is preferably made of metal in order to keep the specific strength high. In a lower front portion of the first lid 11, a first screw hole 11f is formed to fit the cover member therein 14 and to perform maintenance such as draining water after washing or filling with grease.

The second lid 12 has a shape that is substantially symmetrical and has a mirror image relationship with the first lid 11. The second lid 12 is fixedly coupled to the housing unit 10 to cover a second side (the right side as seen in FIG. 2) of the housing unit 10. Provided therewith are a second cover portion 12a, a second cut-out 12b, a second boss portion 12c (second shaft support portion), a second flange portion 12d having substantially a mirror image relationship with the first flange portion 11d, and a mechanism accommodating cover 12e. A second screw hole 12f (see FIG. 2) is also formed at a location opposing the first screw hole 11f. The first and second flange portions 11d and 12d are formed to constitute a circular shape together with the outer peripheral surface of the rear of the mechanism support portion 10b of the housing unit 10. This circular portion is configured to be inserted in the rear of the rotor 3 at a slight gap. The second lid 12 is arranged relatively far from the master gear 7, so a large force is not likely to act on the second boss portion 12c. Thus, in order to reduce the weight thereof, the second lid 12 is made of a synthetic resin such as nylon 66. The second boss portion 12c is formed to protrude outward on the approximate central portion of the wall surface of the second lid 12 and opposing the first boss portion 11c. The second boss portion 12c supports the other end of the master gear shaft 8.

It should be noted that both the lid portions 11 and 12 are fastened by fastening screws 19 such as round-head screws to the housing unit 10. Various modifications are conceivable for the method of fastening the lids 11 and 12, for example, they may be fastened by screws passing from one of the lids to the other lid through the housing unit 10.

The rod-attachment portion 13 is a T-shaped member extending upward from the housing unit 10, and a reel foot 13a formed on the tip thereof and extending longitudinally is adapted to be mounted onto a reel seat (not shown) of a fishing rod. The rod-attachment portion 13 is formed so that thickness-reducing portions 13b and 13c are formed in its upper face and front face to attain weight reduction and uniform wall thickness.

The cover member 14 is curved to cover the sides and the bottom of the housing unit 10 onto which the first and second lids 11 and 12 are mounted from the rear thereof. The cover member 14 is provided in order to close the first and second cut-outs 11b and 12b formed at the rear of the first and second lids 11 and 12, and to prevent from being scratched the side and rear faces of the reel unit 2 including its rear end corner. The cover member 14 is preferably made of a relatively hard synthetic resin such as ABS resin, and its surface is subjected to metal plating. In the cover member 14, stepped screw-fitting holes 14a and 14b are formed at the locations corresponding to the first and second screw holes 11f and 12f. A screw member 14c screwed through the first and second screw holes 11f and 12f is screwed through these screw-fitting holes 14a and 14b so that the cover member 14 is fastened to both of the lids 11 and 12, and also can be opened for maintenance. The cover member 14 is screwed onto the lower surface of the housing unit 10 at the rear end of the lower surface of the cover member 14. It is also fixed by a screw member 14d, which attaches to the bottom of the housing unit 10.

With a reel unit 2 thus configured, the first lid 11, which is arranged adjacent to the master gear 7 and is thus likely to be acted on by a relatively large force, can be made to have a high specific strength. Further, weight reduction is made possible because the first lid 11 is made of an aluminum alloy, which is lightweight and has a high specific strength. Moreover, since the second lid 12, which is far from the master gear 7 and is thus unlikely to be acted on by such a large force, is made from a synthetic resin, weight reduction is achieved. Furthermore, since the housing unit 10 is made of a magnesium alloy, the specific strength of the reel unit 2 as a whole is kept high and weight reduction is attained.

Rotor Drive Mechanism

The rotor drive mechanism 5 includes the master gear shaft 8 into which a handle shaft 1a of the handle 1 is screwed, the master gear 7 formed integrally with the master gear shaft 8, and the pinion gear 9 that meshes with the master gear 7.

The master gear shaft 8 is rotatively mounted to the reel unit 2 by bearings 15a and 15b fitted onto the first and second boss portions 11c and 12c formed in the respective lids 11 and 12 of the reel unit 2. Threaded portions 8a and 8b are respectively formed on the inner circumferential surfaces of both ends of the master gear shaft 8. The threaded portions 8a and 8b are screws that are tightened when the handle 1 is rotated in a line reel-in direction. Therefore, the threaded portion 8a on the left of FIG. 2 is a left-hand screw, whereas the threaded portion 8b on the right of FIG. 2 is a right-hand screw. It should be noted that the handle 1 can be attached to either end of the master gear shaft 8, either to the left side as shown in FIGS. 1 and 2 or the right side as shown in FIG. 3. Nevertheless, since the threaded portions 8a and 8b have different tightening directions, respective handle shafts 1a are made available for specific use in attaching the handle shaft 1a on respective sides. FIG. 2 shows the handle shaft 1a for the left handle.

As shown in FIG. 3, the pinion gear 9 is a hollow tubular member, and its front portion passes through the rotor 3 and is mounted non-rotatably to the rotor 3. A spool shaft 16 is disposed to pass through the inner circumference of the pinion gear 9. A nut 17 is fitted to the front of the pinion gear 9, and the rotor 3 is unrotatably coupled to the pinion gear 9 by the nut 17. The pinion gear 9 is supported rotatably by the respective bearings 18a and 18b at its mid-portion and rear end portion with respect to the shaft axis in the housing unit 10 of the reel unit 2. The bearing 18a is fitted to the mechanism support portion 10b, and the bearing 18b is fitted to the intermediate support portion 10d. A ring-shaped cut-out 9c is formed in the gear portion 9b formed on the rear end side of the pinion gear 9. The ring-shaped cut-out 9c is provided in order to house compactly a later-described gear-down train 20. Since rotor drive mechanisms are a conventional device well known in the art, the structure and function of the rotor drive mechanism 5 will not be explained in further detail herein.

Oscillating Mechanism

As shown in FIGS. 2 and 3, the oscillating mechanism 6 includes the gear-down train 20, a worm shaft 21, a slider 22, and two guide shafts 23a and 23b. The gear-down train 20 meshes with the pinion gear 9. The worm shaft 21 rotates in cooperation with the gear-down train 20. The slider 22 engages with the worm shaft 21 and moves back and forth relative to the reel unit 2. The two guide shafts 23a and 23b guide the slider 22 in the spool shaft 16 direction.

Figure 5:
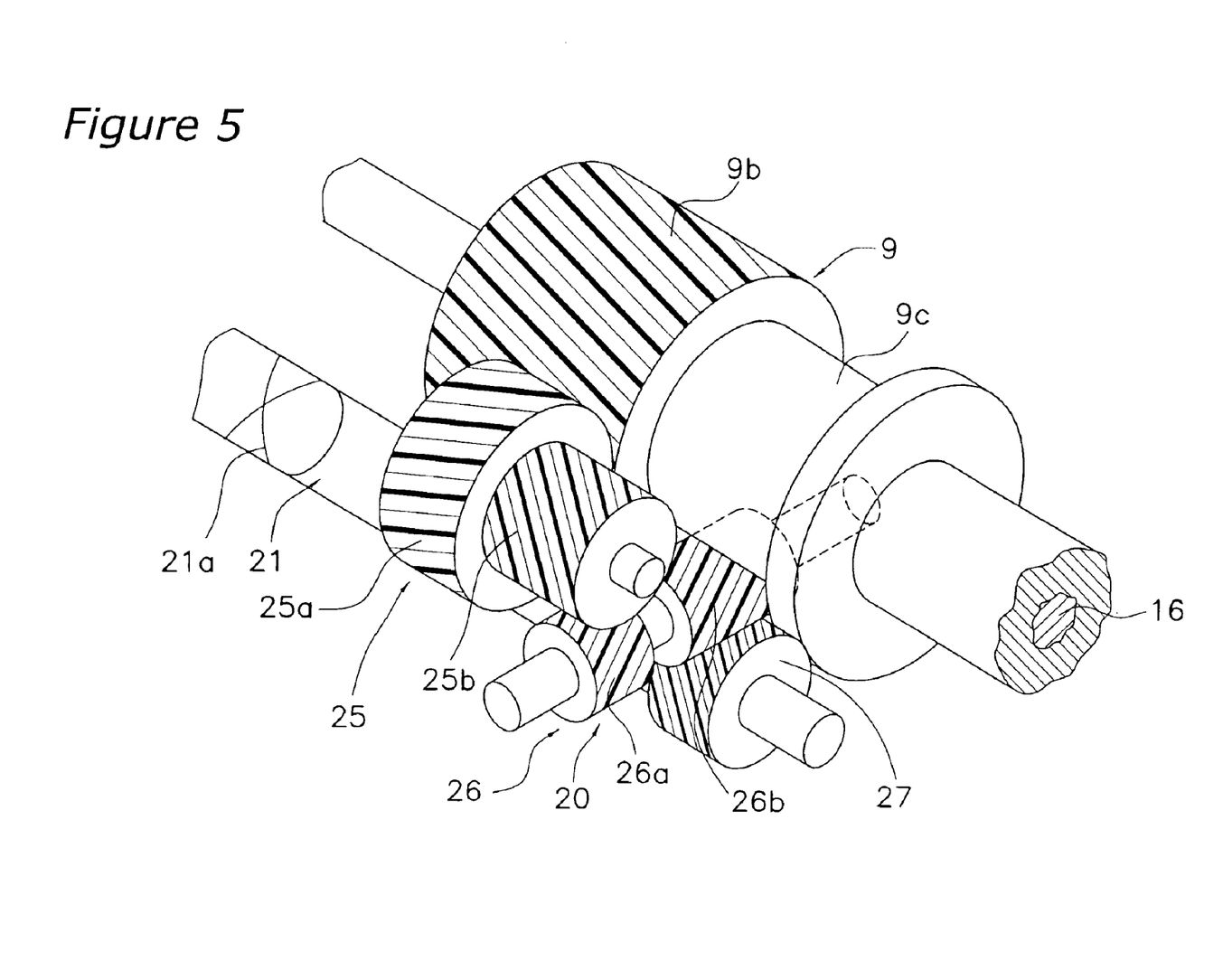
FIG. 5 is an oblique view of a gear-down train of the spinning reel in accordance with the embodiment of the present invention.

As shown in FIGS. 3 and 5, the gear-down train 20 includes a stepped gear 25, a first intermediate gear shaft 26, and a driven gear 27. The stepped gear unit 25 has a large diameter gear 25a and a small diameter gear 25b that mesh with the pinion gear 9. The first intermediate gear shaft 26 includes a first intermediate gear 26a that meshes with the small diameter gear 25b and a second intermediate gear 26b spaced apart from the first intermediate gear 26a. The driven gear 27 is fitted non-rotatably to the worm shaft 21 that meshes with the second intermediate gear 26b.

The stepped gear unit 25 rotates around an axis parallel to the pinion gear 9 rotational axis. The large diameter gear 25a is a screw gear that meshes with the pinion gear 9. The small diameter gear 25b, the first intermediate gear 26a, the second intermediate gear 26b, and the driven gear 27 are also screw gears. The intermediate shaft 26 rotates around an axis different from that of the stepped gear unit 25. Further, the worm shaft 21, to which the driven gear 27 is fitted, rotates around an axis different from that of the intermediate shaft 26 and parallel to the pinion gear 9. The second intermediate gear 26b of the intermediate shaft 26 is disposed below the cut-out 9c of the pinion gear 9. As a consequence, the worm shaft 21 can be arranged closer to the pinion gear 9 than when the cut-out 9c is not formed, and thus the reel as a whole can be made compact. With the gear-down train 20 thus configured, the rotational speed of the pinion gear 9 is greatly reduced when transmitted to the worm shaft 21.

The worm shaft 21 has intersecting helical grooves 21a formed thereon, and is disposed parallel to the spool shaft 16. The worm shaft 21 is rotatively mounted on the front and rear ends of the housing unit 10 via bearings made of, for example, a synthetic resin. The worm shaft 21 is inserted from the rear of the housing unit 10, and is retained by a fixing plate 54 screwed to the rear surface of the housing unit 10.

Referring now to FIGS. 2 and 3, the slider 22 has an engaging member 22a that engages with the grooves 21a of the worm shaft 21. The slider 22 is non-rotatably and axially immovably coupled to the rear end of the spool shaft 16. With the tip of the engaging member 22a engaging with the grooves 21a, the slider 22 moves back and forth relative to the reel unit 2 in the spool shaft direction in accordance with rotation of the worm shaft 21, and thus, moves the spool shaft 16 back and forth in cooperation with rotation of the handle 1.

The guide shafts 23a and 23b pass through the slider 22, and guide the slider 22 along the spool shaft 16. The guide shaft 23a is fixedly held at both ends thereof by the rear end and the intermediate support portion 10d of the housing unit 10. The guide shaft 23a is mounted from the rear of the housing unit 10, and its rear end is retained by a fixing plate 54 that retains the worm shaft 21. The guide shaft 23b is fixed at both ends thereof by the front and rear ends of the housing unit 10. The guide shaft 23b is inserted from the front of the housing unit 10. The front portion of the guide shaft 23b contacts the fastening screw 19 that fastens the front portion of the first lid 11, such that the guide shaft 23 is retained by the fastening screw 19. Oscillating mechanisms are a conventional device well known in the art. Thus, the structure and functions of the oscillating mechanism 6 will not be explained further in detail herein.

Rotor

The rotor 3 is a so-called bail-less type of rotor in which a fishing line guide portion is provided on only one of the rotor arms. As shown in FIGS. 3 and 6 to 8, the rotor 3 includes a rotor unit 30 rotatively mounted to the reel unit 2 via the pinion gear 9, and a fishing line guide portion 31 fitted pivotably onto the rotor unit 30. The rotor unit 30 is made of, for example, a magnesium alloy on the surface of which has an anodic oxide film formed thereon. The rotor unit 30 includes a cylindrical support portion 32 and first and second rotor arms 33 and 34 spaced from the support portion 32 and extending forward from respective opposing locations on the outer peripheral surfaces of the rear end of support portion 32.

The support portion 32 is a substantially cylindrical member that is tapered so that its diameter decreases from the rear end toward the front and is then formed into a cylindrical shape. A front wall 32a is formed on the front portion of the support portion 32, and a boss portion 32b through which the front of the pinion gear 9 passes is formed in the central portion of the front wall 32a. The boss portion 32b is non-rotatably mounted to the front of the pinion gear 9. The nut 17 is screwed onto the front of the pinion gear 9 at the front of the front wall 32a, and the rotor 3 is fastened to the pinion gear 9 by the nut 17. A tubular-shaped line-entanglement prevention member 35 that prevents entanglement of fishing line with the spool shaft 16 is mounted at the front of the support portion 32.

A fishing line guide portion 31 is mounted on the tip of the first rotor arm 33 to be pivotable between a line-winding posture and a line-releasing posture. An interlocking mechanism 40 that interlocks with the pivoting of the fishing line guide portion 31 is mounted in the first rotor arm 33. The radially outward periphery of the first rotor arm 33 is covered by a first cover member 36.

Like the first rotor arm 33, the second rotor arm 34 extends forward and its radially outward periphery is covered by a second cover member 37. The second rotor arm 34 is provided for the purpose of maintaining the rotational balance of the rotor 3. For this reason, the second rotor arm 34 is configured such that its center of gravity is tilted forward in order to bring it close to the center of gravity of the first rotor arm 33 on which the fishing line guide portion 31 is mounted. In order to shift the center of gravity forward, an opening 34a is formed in the base end side of the second rotor arm 34, and a weight-accommodating portion 34b for mounting a weight 38 is formed in the tip side thereof. The weight 38 is made of, for example, a tungsten alloy. Further, in order to shift the center of gravity forward, the second rotor arm 34 extends forward at a length that is longer than that of the first rotor arm 33, as clearly seen from FIGS. 7 and 8.

Figure 6:
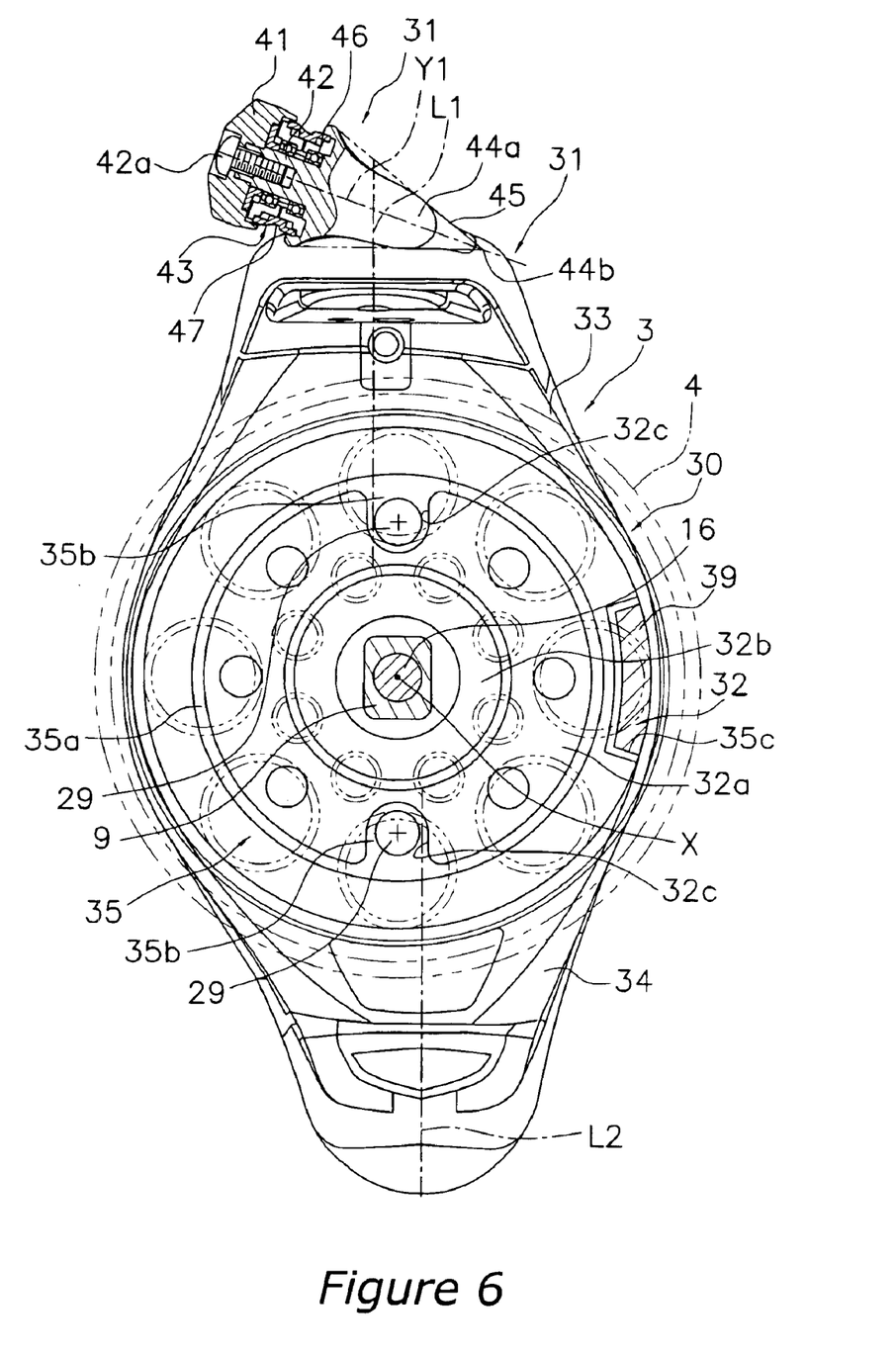
FIG. 6 is a front view of a rotor of the spinning reel in accordance with the embodiment of the present invention.

Here, as shown in FIG. 6, the two rotor arms 33 and 34 are formed such that a first line L1 drawn through the pivot center of the fishing line guide portion 31 of the first rotor arm 33 and a second line L2 drawn through the width-wise center of the second rotor arm 34 and substantially parallel to the first line L1 are arranged so that they are spaced at the same distance from the rotational axis X of the rotor unit 30 on opposite sides thereof. When the rotor arms 33 and 34 are arranged in this manner, the rotational balance can be maintained at an even more desirable level even if the fishing line guide portion 31 is tilted outward from the rotational axis X (outward with respect to the first line L1 in FIG. 6).

Referring now to FIGS. 3 and 6, the line-entanglement prevention member 35 includes a cylindrical entanglement-preventing portion 35a formed to be flush with the cylindrical portion of the support portion 32, and a pair of tongue-shaped attachment portions 35b provided on the rear end of the entanglement-preventing portion 35a and opposed to the center. The tip of the entanglement-preventing portion 35a has a larger diameter than the rest of the entanglement-preventing portion 35a, thereby preventing the fishing line that has entered the inside of the spool 4 from entering the rotor 3. In addition, a weight-accommodating portion 35c for accommodating a weight 39 for correcting rotational balance is formed on the inner peripheral surface of the tip of the entanglement-preventing portion 35a. The weight 39 is also made of, for example, a tungsten alloy. Note that the weight accommodating portion 35c is depicted in FIG. 3 as if it were formed at a location near the second rotor arm 34 for the sake of clarity in illustration. The weight accommodating portion 35c is actually disposed, as shown in FIG. 6, at the mid position between the two rotor arms 33 and 34 in the direction in which the fishing line guide portion 31 pivots. By disposing the weight accommodating portion 35c in this way, the rotational balance can be corrected by the weight 39 disposed on the opposite side of the fishing line guide portion 31 with respect to the rotational axis X, even if the fishing line guide portion 31 is tilted further away from the rotational axis X than the first line L1.

The line-entanglement prevention member 35 is fastened to the front wall 32a by two screw members 29 screwed from the front of the attachment portions 35b. The front face of the front wall 32a is formed to be a flat surface in a ring-like shape when the line-entanglement prevention member 35 is fitted, and even with the attachment portions 35b. In order to form such a flat surface with the attachment portions 35b on the front face of the front wall 32a, recessed portions 32c in which the tongue-shaped attachment portions 35b are fitted are formed in the front wall 32a. Accordingly, the structure is configured so that even when foreign matter enters from the spool 4 side and attaches to the spool 4, the foreign matter can be easily removed by detaching the spool 4 and, for example, wiping it off.

Figure 7:
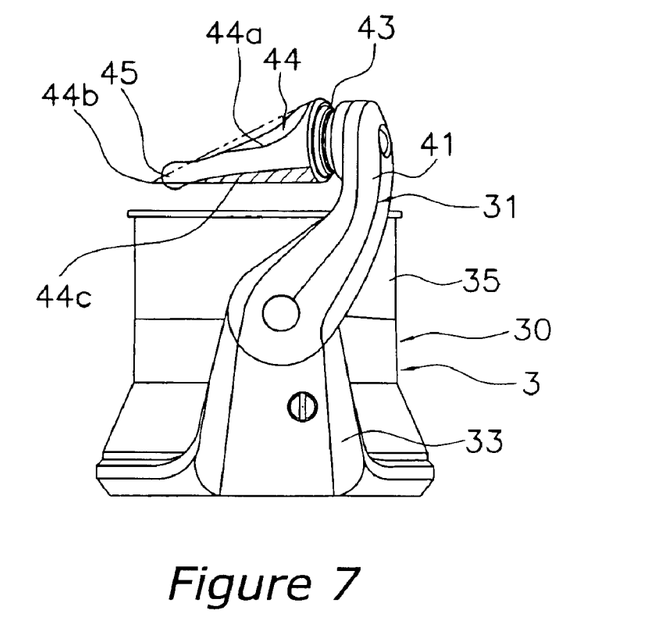
FIG. 7 is a right side view of the rotor of the spinning reel in accordance with the embodiment of the present invention.
Figure 8:
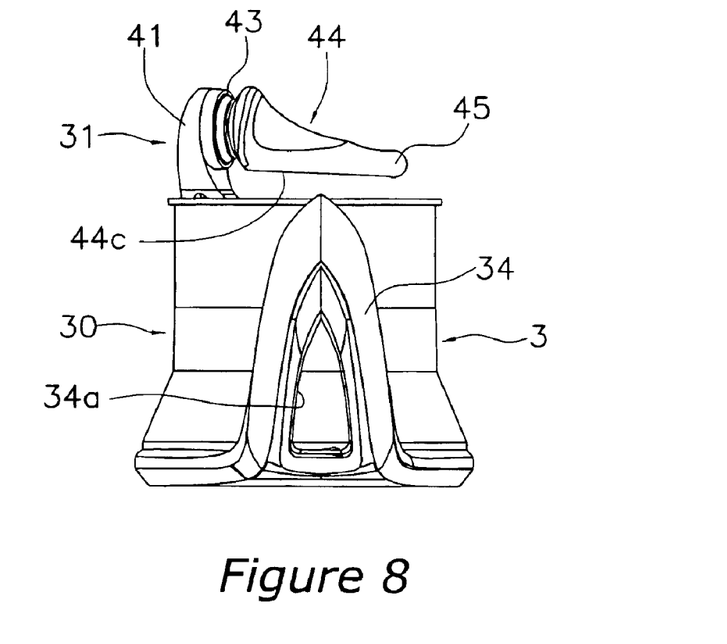
FIG. 8 is a left side view of the rotor of the spinning reel in accordance with the embodiment of the present invention.

The fishing line guide portion 31 includes, as shown in FIGS. 6 to 8, a support member 41, a stationary shaft 42, a line roller 43, a stationary shaft cover 44, and a fishing line-catching portion 45. The support member 41 is fitted to the tip of the first rotor arm 33. The stationary shaft 42 has a base end fixed to the tip of the support member 41. The line roller 43 is rotatively mounted to the stationary shaft 42, and is capable of guiding fishing line. The stationary shaft cover 44 is provided on the tip of the stationary shaft 42. The fishing line-catching portion 45 is provided on the tip of the stationary shaft cover 44, and catches the fishing line.

The support member 41 is fitted on the tip so that it can pivot between a line-winding posture and a line-releasing posture. The stationary shaft 42 is configured so that its base end is locked non-rotatably to the tip of the support member 41, and is fixedly attached to the support member 41 by a mounting bolt 42a. The line roller 43 is rotatively mounted on to the outer periphery of the stationary shaft 42 via a pair of bearings 46. A ring-shaped guide groove 47 to guide fishing line is formed on the outer peripheral surface of the line roller 43, and thus, line kinks do not easily occur. Both ends of the outer periphery of the line roller 43 are covered by the support member 41 and the stationary shaft cover 44.

The stationary shaft cover 44 is provided on the tip of the stationary shaft 42, and is an approximately cone-shaped member whose vertex 44b is tilted rearward from the shaft axis Y1 of the stationary shaft and toward the rotational center of the rotor 3. The region indicated by hatching in FIG. 7 that is near the ridge line of the stationary shaft cover 44 on the rear surface thereof forms the fishing line guide surface 44c that guides fishing line to the line roller 43. A thumb recess portion 44a that is recessed from the rest of the stationary shaft cover 44 is formed on the front face of the stationary shaft cover 44. This type of a thumb recess portion 44a is useful in returning the fishing line guide portion 31 from the line-winding posture to the line-releasing posture. The fishing line-catching portion 45 is formed so that it bulges below the vertex 44b to continue smoothly with its ridge line and protrude outwardly from the vertex 44b, and so that the tip thereof is thicker than the rest of the portion. The tip of the fishing line-catching portion 45 is rounded into a spherical shape.

With the fishing line guide portion 31 thus configured, the fishing line does not easily come off once it is caught by the fishing line-catching portion 45 because the tip of the fishing line-catching portion 45 is thicker than the other portions thereof. In addition, since the fishing line-catching portion 45 and the vertex 44b of the stationary shaft cover 44 are tilted rearward, the fishing line caught by the fishing line-catching portion 45 can be reliably guided to the guide groove 47 of the line roller 43 by the line-guiding surface. Rotors are a conventional device well known in the art. Accordingly, the structure and functions of the rotor 3 will not be explained in further detail herein.

Anti-Reverse Mechanism

As shown in FIG. 3, the anti-reverse mechanism 50 can prohibit/permit the rotation of the rotor 3 in the line reel-out direction. The anti-reverse mechanism 50 includes the roller-type one-way clutch 51 fitted to the mechanism support portion 10b of the housing unit 10. The one-way clutch 51 can be switched between a reverse-rotation prohibited state and a reverse-rotation permitted state. The anti-reverse mechanism 50 further includes the switching operation unit 52 for switching the one-way clutch 51 between the reverse-rotation prohibited state and the reverse-rotation permitted state. The switching operation unit 52 is supported pivotably by the operation support portion 10c and the intermediate support portion 10d of the housing unit 10.

Figure 9:
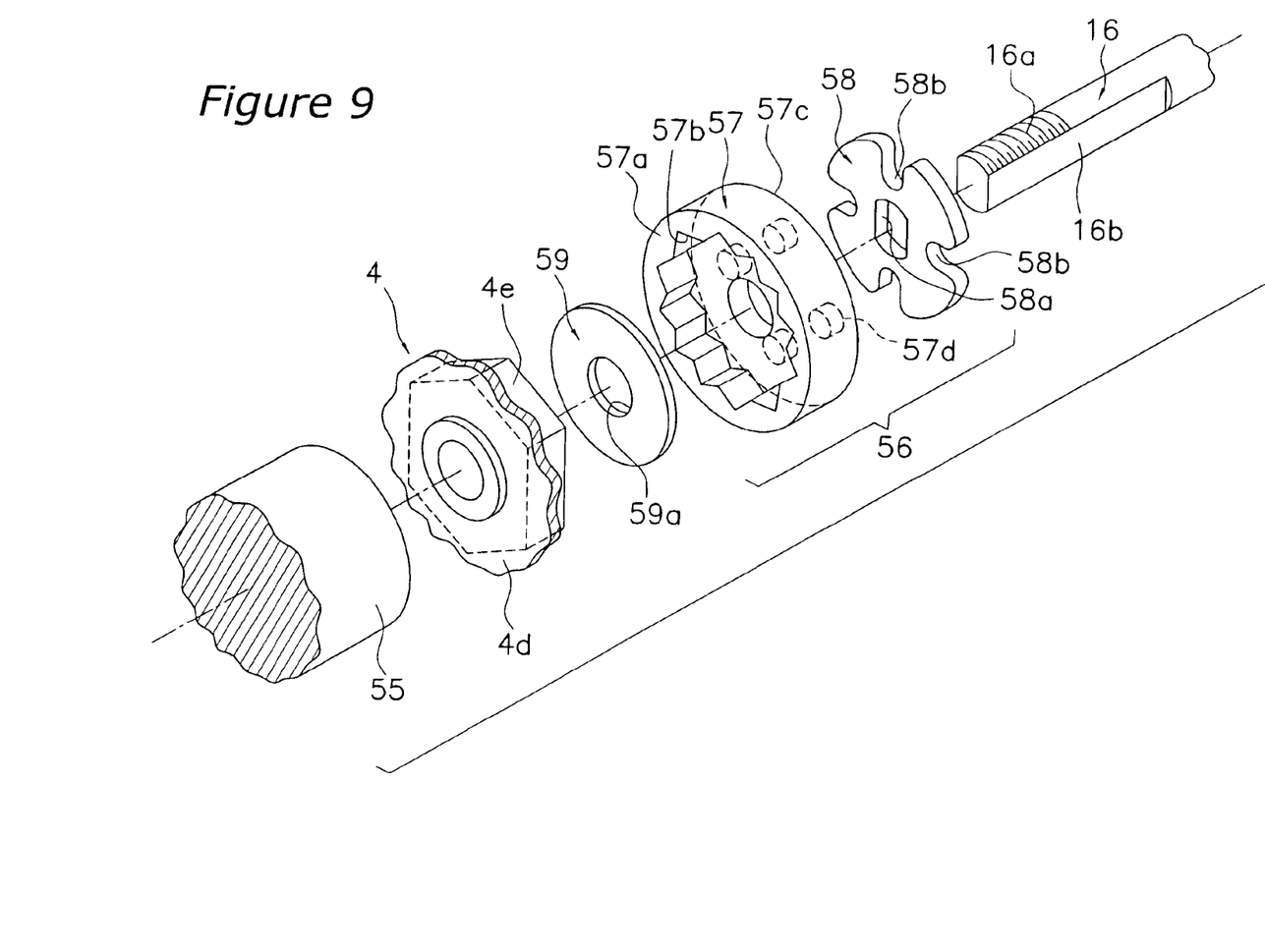
FIG. 9 is an exploded oblique view showing a mounting structure of a spool of the spinning reel in accordance with the embodiment of the present invention.

As shown in FIG. 9, a male threaded portion 16a and chamfered portions 16b that are cut out parallel to each other are formed on the tip or fore-end of the spool shaft 16. Further, the spool 4 is fitted non-rotatably and detachably to the spool shaft 16 by a removable nut 55 that is screwed on the male threaded portion 16a.

As shown in FIG. 3, the spool 4 has a shallow-channel contour. The spool 4 includes a bobbin trunk 4a, a cylindrical skirt portion 4b, and a front flange 4c. Fishing line is wound around the outer periphery of the bobbin trunk 4a. The cylindrical skirt portion 4b is formed on the rear end of the bobbin 4a to have a larger diameter than the bobbin 4a. The front flange portion 4c is formed on the front end of the bobbin 4a to have a slightly larger diameter than the bobbin 4a.

The bobbin 4a is non-rotatable relative to the spool shaft 16, and is arranged on the outer peripheral side of the support portion 32 and the line-entanglement prevention member 35 of the rotor 3. The bobbin 4a includes a front wall portion 4d formed integrally with the tip side of the inner periphery of the bobbin 4a, and a boss portion 4e formed integrally with the inner peripheral side of the front wall portion 4d to protrude rearward. The front wall portion 4d has a number of perforations 4g formed therein that serve to reduce weight.

As shown in FIG. 9, the boss portion 4e has a regular hexagonal outer shape. The boss portion 4e is fitted rotatably to the spool shaft 16, but is made non-rotatable relative to the spool shaft 16 with a mounting member 56. The mounting member 56 includes a boss-engagement portion 57 to engage non-rotatably with the boss portion 4e, and an engagement member 58 to make the boss-engaging portion 57 non-rotatable relative to the spool shaft 16. The boss-engagement portion 57 includes an interlock recess 57b that has a twelve-point star-like cross section. The interlock recess 57b is formed in a front face 57a of the boss-engagement portion 57 opposing the boss portion 4e. The four circular interlock projections 57d engage with the engagement member 58 provided on a rear face 57c of the boss-engagement portion 57. The engagement member 58 is a disk-like member having at its center a slit 58a configured to engage non-rotatably the chamfered portions 16b of the spool shaft 16. Also provided on its outer peripheral surface are four interlock grooves 58b to interlock with the interlock projections 57d. By fitting the slit 58a with the chamfered portions 16b, the engagement member 58 is fitted non-rotatably to the spool shaft 16. By interlocking the interlock projections 57d with the interlock grooves 58b, the boss-engagement portion 57 is made non-rotatable relative to the spool shaft 16. It should be noted that a washer member 59 made of an elastic material is fitted in the interlock recess 57b of the boss-engagement portion 57. The washer member 59 has a hole 59a having an unstretched or relaxed inner diameter slightly smaller than the outer diameter of the spool shaft 16. By fitting the hole 59a onto the spool shaft 16, back-and-forth movement of the boss-engagement portion 57 and the engagement member 58 is restricted relative to the spool shaft 16.

By engaging the interlock recess 57b having a star-like cross section with the boss portion 4e having a hexagonal cross section, the spool 4 can be fitted onto the spool shaft 16 non-rotatably with a 30-degree rotational phase. Consequently, the spool 4 can be rotated by merely loosening the removable nut 55, and the hanging length of the tackle can be adjusted without rotating the rotor 3.

As shown in FIG. 1, the skirt portion 4b has formed thereon a number of perforations 4f having varied inner diameters that serve to reduce weight. The front flange portion 4c has a tapered outer peripheral surface that slightly increases in diameter from the outer peripheral surface of the bobbin 4a toward the front. This greatly reduces the release resistance that acts on fishing line when casting.

Next, handling and operation of the spinning reel will be discussed.

It should be noted that the description of the handling describes a situation in which casting is performed with the right hand. Initially referring to FIGS. 1 and 3, when casting, the fishing line guide portion 31 is put in the line-winding posture to hook the fishing line on the fishing line guide portion 31, and the hanging length of the tackle is then adjusted.

First, the handle 1 is rotated in the line reel-in direction so that the fishing line guide portion 31 is in a predetermined rotational phase in which the spool 4 is disposed near the tip of its stroke. Specifically, when casting with the right hand, for example, the fishing line guide portion 31 is easily operated with the left hand when the fishing line guide portion 31 is on the left of the spool 4, viewed from the rod side, taking into consideration the operability of the fishing line guide portion 31 and the ease of picking up the fishing line.

Referring to FIG. 3, to change the hanging length of the tackle, the removable nut 55 is loosened and the spool 4 is moved forward to release the engagement between the boss portion 4e and the boss-engagement portion 57. The spool 4 is rotated in this state so that the hanging length of the tackle is adjusted to be at an appropriate position. After adjusting the hanging length of the tackle, the spool 4 is moved rearward to engage the boss portion 4e with the boss-engaging portion 57. At this time, the hanging length of the tackle can be finely adjusted since the boss portion 4e can engage with the boss-engagement portion 57 every 30 degrees. Then, the removable nut 55 is tightened, and the adjustment of the hanging length is thus completed.

Referring now to FIGS. 7 and 8, in this state, with the fingertip of the left hand (the hand not holding the fishing rod), the stationary shaft cover 44 of the fishing line guide portion 31 is grasped to pivot the fishing line guide portion 31 over to the line-releasing posture. When this is done, the stationary shaft cover 44 can be easily grasped and the fishing line guide portion 31 can be grasped and easily pivoted because the thumb recess portion 44a is formed on the stationary shaft cover 44. Then, fishing line wound on the spool 4 is grasped with the left hand, and the fishing rod is cast with the index finger of the right hand hooking the line.

After casting, the fishing line guide portion 31 is pivoted back from the line-releasing posture to the line-winding posture with the left hand, and the fishing line is grasped with the left hand to place it in the fishing line-catching portion 45 of the fishing line guide portion 31. The fishing line caught with the fishing line-catching portion 45 is guided through the fishing line guide surface 44c of the stationary shaft cover 44 to the guide groove 47 of the line roller 43. The handle 1 is slightly rotated in the line reel-in direction in this state to apply slight tension to the fishing line, and the rod is set aside.

Referring again to FIG. 3, when a fish is caught on the tackle and the handle 1 is rotated, the rotor 3 rotates in the line reel-in direction and the spool 4 is moved back and forth. At that time, rotation of the handle 1 is transmitted to the master gear 7 through the master gear shaft 8, rotating the rotor 3 through the pinion gear 9. In addition, the oscillating mechanism 6 is operated with the pinion gear 9 via the gear-down train 20, moving the spool 4 back and forth. Even if the fish is large and a large force acts on the master gear 7 during the winding operation, the specific strength of the first lid 11 that is disposed near the master gear 7 can be maintained at a high level because the first lid 11 is made of an aluminum alloy. Moreover, since the first lid 12 is made of a synthetic resin and the housing unit 10 is made of a magnesium alloy, weight reduction can be attained.

Here, by making the first lid 11 out of a light alloy, which has a small specific gravity among metals, it becomes possible to maintain a high specific strength of the first lid 11 that is disposed near the master gear 7 and on which a relatively large force tends to act, thus achieving weight reduction. In addition, the second lid 12, which is far from the master gear 7 and on which a large force tends not to act, can be made of a synthetic resin and thus the weight thereof can be reduced. Therefore, with regard to the reel unit 2 as a whole, the specific strength can be maintained and weight reduction achieved.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) In the foregoing embodiment, the reel unit according to the present invention was described as a part of a bail-less type of spinning reel having a fishing line guide portion 31. However, the present invention may also be applied to a reel unit for a so-called standard spinning reel having bail arms, in which the fishing line guide portion includes first and second bail support members pivotably mounted to the tips of the first and second rotor arms, and a bail for coupling a stationary shaft cover of the first bail support member and the second bail support member.

(b) In the foregoing embodiment, the first and second lids 11 and 12 are provided with the respective cut-outs 11b and 12b, but the second lid 12, which is made of a synthetic resin and relatively lightweight, is not necessarily provided with the second cut-out.

(c) Although the housing unit 10 is made of a magnesium alloy in the foregoing embodiment, the material of the housing unit 10 is not limited to a magnesium alloy and may be any metal that is lightweight and has high specific strength, such as an aluminum alloy and a titanium alloy, or a synthetic resin that is lightweight and has a high specific strength, such as a glass fiber-reinforced nylon and a carbon fiber-reinforced resin.

(d) Although the material of the first lid 11 is an aluminum alloy in the foregoing embodiment, the first lid 11 may be made of any metal that is lightweight and has a high specific strength, such as a titanium alloy.

Figure 10:
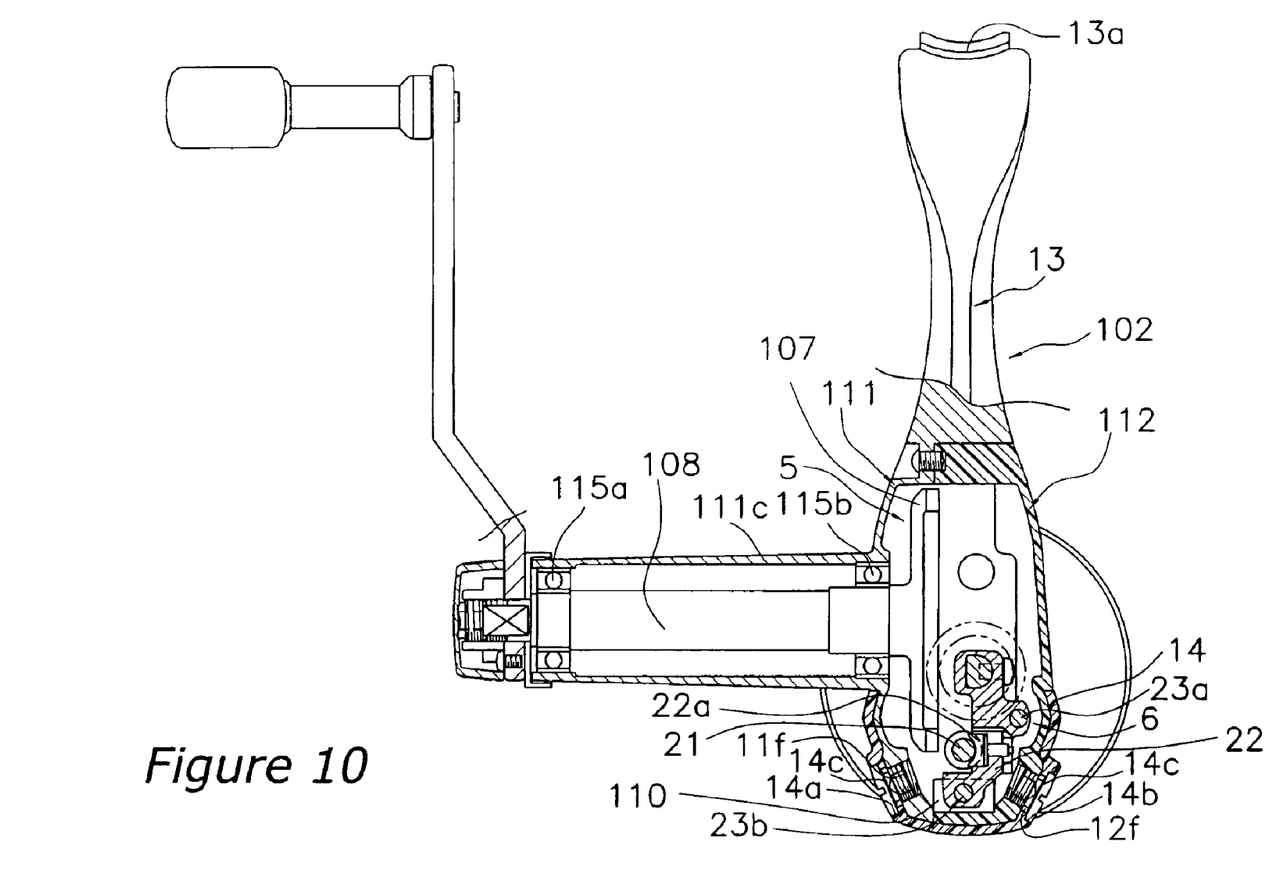
FIG. 10 is a cross-sectional rear view of the spinning reel in accordance with another embodiment of the present invention, corresponding to FIG. 2.

(e) Although the rod-attachment portion 13 is formed integrally with the housing unit 10 in the first embodiment, as shown in FIG. 10, a rod-attachment portion 13 may be formed integrally with a first lid 111, and not with a housing unit 110. In addition, in the first embodiment, the first and second lids 11 and 12 are provided with the boss portions 111e and 12c to support the master gear shaft. However, in this embodiment, a first lid 111 is provided with a tubular boss portion 111c (shaft support portion) to cantilever a master gear shaft 108 formed integrally with a master gear 107. The master gear shaft 108 is rotatively supported on the boss portion 111c by a pair of bearings 115a and 115b that are spaced apart from the boss portion 111c. Here, a second lid 112 is not provided with a boss portion and therefore has a smooth exterior appearance. Furthermore, in this embodiment, the second lid 112 and the housing unit 110 are formed integrally of, for example, a synthetic resin or a light metal such as a magnesium alloy, with the first and second lids 111 and 112 being provided with first and second covers and first and second cut-outs. It should be noted that, although not shown in the drawings, it is possible to adopt a two-piece reel-unit configuration, in which the reel unit is divided into two pieces, where both ends of the master gear shaft are supported by the lids.

According to the present invention, a first cut-out is formed in a part of a lid where the cover member and the lid overlap and apart from the part of the lid that covers the master gear, where the specific strength needs to be maintained high. Therefore, weight reduction is possible corresponding to the proportion of the cut-out of the lid. Moreover, since the first cut-out is covered by the cover member, the reel unit is prevented from getting scratched.

As used herein, the following directional terms "forward, rearward, above, downward, vertical, horizontal, below and transverse" as well as any other similar directional terms refer to those directions of a reel equipped with the present invention. Accordingly, these terms, as utilized to describe the present invention should be interpreted relative to a reel equipped with the present invention.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-28471. The entire disclosure of Japanese Patent Application No. 2003-28471 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning-reel reel unit adapted to be mounted onto a fishing rod, for use in a spinning reel in which rotation of a handle is transmitted to a rotor and a line-winding spool through a master gear to wind fishing line around the spool, the master gear being non-rotatably coupled to a master gear shaft, the spinning-reel reel unit comprising:
   a housing unit having a mechanism accommodating space formed therein for accommodating and supporting therein the master gear;
   a first lid being fixedly coupled to a side of the housing unit detachably/reattachably, the first lid including a first cover portion for at least partially covering the mechanism accommodating space of the housing unit in which the master gear is disposed, and a first cut-out portion for partially exposing the housing unit in a direction parallel to the master gear shaft;
   a second lid fixedly coupled to another side of the housing unit detachably and reattachably;
   a rod-attachment portion formed integrally with one of the housing unit and the first lid and being adapted to be mounted to the fishing rod; and
   a cover member for covering at least the first cut-out portion of the first lid when the first lid is coupled to the housing unit.

2. The spinning-reel reel unit as set forth in claim 1, wherein
   the second lid includes a second cover portion for at least partially covering the mechanism accommodating space of the housing unit, and a second cut-out portion for at least partially exposing the housing unit, and
   the cover member covers the second cut-out portion when the first and second lids are coupled to the housing unit.

3. The spinning-reel reel unit as set forth in claim 1, wherein the housing unit is made of a magnesium alloy.

4. The spinning-reel reel unit as set forth in claim 1, wherein the first lid is made of an aluminum alloy.

5. The spinning-reel reel unit as set forth in claim 1, wherein the second lid is made of a synthetic resin.

6. A spinning-reel reel unit adapted to be mounted onto a fishing rod, for use in a spinning reel in which rotation of a handle is transmitted to a rotor and a line-winding spool through a master gear to wind fishing line around the spool, the master gear being non-rotatably coupled to a master gear shaft, the spinning-reel reel unit comprising:
   a housing unit having a mechanism accommodating space formed therein for accommodating and supporting therein the master gear;
   a first lid being fixedly coupled to a side of the housing unit detachably and reattachably, the first lid including a first cover portion for at least partially covering the mechanism accommodating space of the housing unit in which the master gear is disposed, and a first cut-out portion for partially exposing the housing unit in a direction parallel to the master gear shaft, the first lid supporting a rotation shaft of the master gear;
   a second lid formed integrally with the housing unit, the second lid including a second cover portion for at least partially covering the mechanism accommodating space of the housing unit in which the master gear is disposed, and a second cut-out portion for partially exposing the housing unit in the direction parallel to the master gear shaft;
   a rod-attachment portion formed integrally with one of the housing unit and the first lid and being adapted to be mounted to the fishing rod; and
   a cover member for covering at least the first cut-out portion of the first lid and the second cut-out portion of the second lid when the first lid is coupled to the housing unit.

7. The spinning-reel reel unit as set forth in claim 1, wherein
the first and second lids have first and second shaft-supporting portions for supporting respective ends of the master gear.

8. The spinning-reel reel unit as set forth in claim 1, wherein
the first lid has a shaft-supporting portion for cantilevering the master gear.

9. The spinning-reel reel unit as set forth in claim 1, wherein
the rod-attachment portion is formed integrally with the housing unit.

10. The spinning-reel reel unit as set forth in claim 1, wherein
the rod-attachment portion is formed integrally with the first lid.

11. The spinning-reel reel unit as set forth in claim 1, wherein
the cover member is fitted extending over a rear portion to a bottom portion of the housing unit.

12. The spinning-reel reel unit as set forth in claim 1, wherein
the cover member is made of a synthetic resin.

13. A spinning reel being adapted to be mounted to a fishing rod, said spinning reel comprising:
a handle;
a reel unit rotatably supporting said handle and being adapted to be mounted to the fishing rod, said reel unit including
a housing unit having a mechanism accommodating space formed therein, the mechanism accommodating space supporting therein a master gear non-rotatably coupled to a master gear shaft for transmitting rotation of the handle;
a first lid being fixedly coupled to a side of the housing unit detachably and reattachably, the first lid including a first cover portion for at least partially covering the mechanism accommodating space of the housing unit in which the master gear is disposed, and a first cut-out portion for partially exposing the housing unit in a direction parallel to the master gear shaft;
a second lid fixedly coupled to another side of the housing unit;
a rod-attachment portion formed integrally with one of the housing unit and the first lid and being adapted to be mounted to the fishing rod; and
a cover member for covering at least the first cut-out portion of the first lid when the first lid is coupled to the housing unit;
a rotor rotatably mounted on a front o said reel unit; and
a spool disposed on a front of said rotor to move front and rear relative to said reel unit.

14. The spinning reel as set forth in claim 13, wherein
the second lid includes a second cover portion for at least partially covering the mechanism accommodating space of the housing unit, and a second cut-out portion for at least partially exposing the housing unit, and
the cover member covers the second cut-out portion when the first and second lids are coupled to the housing unit.

15. The spinning reel as set forth in claim 13 wherein
the housing unit is made of a magnesium alloy.

16. The spinning reel as set forth in claim 13 wherein
the first lid is made of an aluminum alloy.

17. The spinning reel as set forth in claim 13, wherein
the second lid is made of a synthetic resin.

18. The spinning reel as set forth in claim 13, wherein
the first lid is disposed adjacent to the master gear to rotatably support the rotational shaft, and
the second lid is formed integrally with the housing unit and includes a second cover portion for at least partially covering the mechanism accommodating space of the housing unit in which the master gear is disposed, and a second cut-out portion for partially exposing the housing unit.

19. The spinning reel as set forth in claim 13, wherein
the first and second lids have first and second shaft-supporting portions for supporting respective ends of the master gear shaft.

20. The spinning reel as set forth in claim 13, wherein
the first lid has a shaft-supporting portion for cantilevering the master gear shaft.

21. The spinning reel as set forth in claim 13, wherein
the rod-attachment portion is formed integrally with the housing unit.

22. The spinning reel as set forth in claim 13, wherein
the cover member is fitted extending over a rear portion to a bottom portion of the housing unit.

23. The spinning reel as set forth in claim 13, wherein
the cover member is made of a synthetic resin.

* * * * *